United States Patent [19]
Kushida
[11] Patent Number: 4,678,000
[45] Date of Patent: Jul. 7, 1987

[54] HIGH SPEED ELECTROMAGNETIC VALVE

[75] Inventor: Takeo Kushida, Higashi-Matsuyama, Japan
[73] Assignee: Diesel Kiki Co., Ltd., Tokyo, Japan

[21] Appl. No.: 815,998
[22] Filed: Jan. 2, 1986
[30] Foreign Application Priority Data
Jan. 18, 1985 [JP] Japan .................................... 60-7191
[51] Int. Cl.[4] .............................................. F16K 31/06
[52] U.S. Cl. ........................................... 137/1; 251/75; 251/129.16; 251/129.1; 251/129.06; 310/328
[58] Field of Search ............. 310/328; 251/75, 129.16, 251/129.1, 129.06

[56] References Cited

U.S. PATENT DOCUMENTS

| | | | |
|---|---|---|---|
| 3,292,019 | 12/1966 | Hsu et al. | 310/328 |
| 3,390,559 | 7/1968 | Steutzer | 310/328 |
| 3,771,760 | 11/1973 | Sheldon et al. | 251/75 |
| 4,165,762 | 8/1979 | Alar | 251/75 X |
| 4,492,891 | 1/1985 | Wieters | 310/328 |

FOREIGN PATENT DOCUMENTS

| | | | |
|---|---|---|---|
| 145610 | 6/1985 | European Pat. Off. . | |
| 2049242 | 4/1972 | Fed. Rep. of Germany | 251/129.16 |
| 3099915 | 5/1982 | Fed. Rep. of Germany . | |
| 3207619 | 9/1983 | Fed. Rep. of Germany . | |
| 876370 | 8/1961 | United Kingdom . | |

*Primary Examiner*—Arnold Rosenthal
*Attorney, Agent, or Firm*—Wenderoth, Lind & Ponack

[57] ABSTRACT

A high speed electromagnetic valve is disclosed in which an electromagnetic actuator is provided in which an armature is moved relative to a stator having excitation coils, and a valve rod fixed to the armature and a holding means capable of holding the armature and the valve rod according to electric current. This holding means is formed in such way that a plurality of piezoelectric elements are sandwiched in a plurality of electrode plates, and holding power by the piezoelectric operation is generated to hold the armature and the valve rod.

2 Claims, 6 Drawing Figures

HIGH SPEED ELECTROMAGNETIC VALVE

BACKGROUND OF THE INVENTION

1. Field of the Invention

This invention relates to electromagnetic valves of a high speed drive, and more particularly to electromagnetic valves for controlling the opening or closing of, for example, a fuel jet valve.

2. Prior Art

Heretofore, electromagnetic valves of this kind, for example, as disclosed in official gazette of Japanese Patent Laid-open Publication No. 55-26099, an electromagnetic valve is known in which an armature is moved relative to a stator by excitation of an excitation coil provided on the stator.

However, in the foregoing conventional example, due to self inductance of the excitation coil, the excitation electric current moderately rises as shown by the dotted line in FIG. 3, and when the armature reaches a predetermined position, the excitation electric current once decreases once, and thereafter, it moves toward a predetermined value gradually. Accordingly, the generating power becomes gradually larger according to a change of the excitation electric current as shown by the dotted line in FIG. 4. For this reason, the armature is moderately displaced relative to time as shown by the dotted line in FIG. 5, and when reaching a predetermined position at $T_2$ seconds from an electric current supply start time $T_0$ to the excitation coil, the high speed response property of the electromagnetic valve is deteriorated which has been a problem.

SUMMARY OF THE INVENTION

An object of this invention is to provide a high speed electromagnetic valve which solves the problems of the conventional examples resulting from the building-up characteristics of the excitation electric current.

Another object of this invention is to control an operation time of the electromagnetic valve at a high precision by providing a holding means having a piezoelectric element.

According to this invention, a high speed electromagnetic valve has an electromagnetic actuator moving an armature relative to a stator by excitation of excitation coils, an electromagnetic valve is provided which has a valve rod fixed to the armature of the electromagnetic actuator and a holding means is provided around this valve rod for holding the armature and the valve rod according to the supply of electric current.

Many other advantages, features and additional objects of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION OF THE INVENTION

Figure 1:
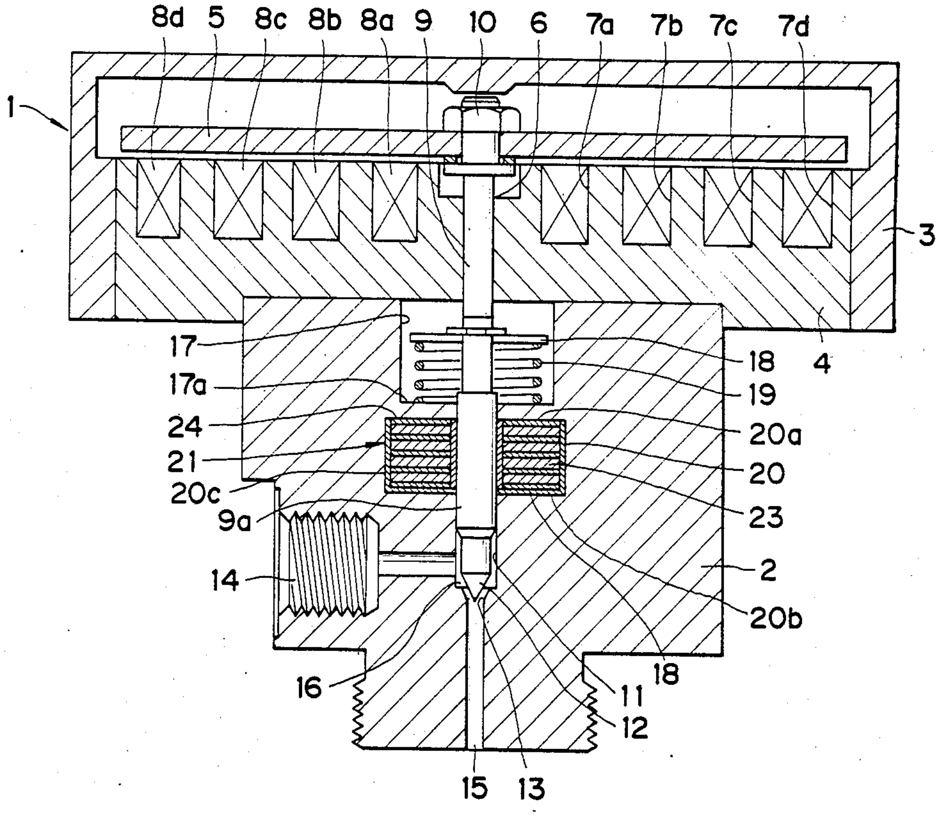
FIG. 1 is a cross-sectional view of a high speed electromagnetic valve according to this invention.

In FIG. 1, an electromagnetic actuator 1 forms an electromagnetic valve mounted on a fuel injection valve proper 2, and a housing 3 is fixed to an outer periphery of a stator 4, and the electromagnetic actuator 1 is housed in this housing 3.

The electromagnetic actuator 1 is provided with a stator 4 made of magnetic material and an armature 5 made of similar magnetic material, and the stator 4 and the armature 5 are disposed opposite one another.

In the center of the stator 4 is a center hole 6 through which a valve rod 9 to be described hereinafter runs. On the upper surface of the stator 4, for example, four concave portions *7a*–*7d* are concentrically formed centering around the center hole 6, and the concave portions *7a*–*7d* are embedded with excitation coils 8*a*–8*d* respectively. The excitation coils 8*a*–8*d* are set such that the winding directions of the adjacent coils are mutually opposite.

Also, a valve rod 9 is fixed to the armature 5 by a nut 10 screwed to its upper end.

This valve rod 9 runs through the center hole 6 of the stator 4, and a slide portion 9*a* having a large diameter is slidably inserted in a slide hole 11 formed in a valve proper 2. Moreover, a tapered valve head portion 12 is formed at a lower end of the valve rod 9, and when the valve rod 9 is displaced in the lower direction, the valve head portion 12 seals a valve seat 13 formed on the valve proper 2 and interrupts the communication of a fuel inlet path 14 and a fuel outlet path 15 provided on the valve proper 2. Furthermore, when the valve rod 9 is displaced in the upper direction and the valve head portion 12 is separated from the valve seat 13, the fuel inlet path 14 and the fuel outlet path 15 communicate by means of a communicating chamber 16 formed in succession to the slide hole 11.

Figure 2:
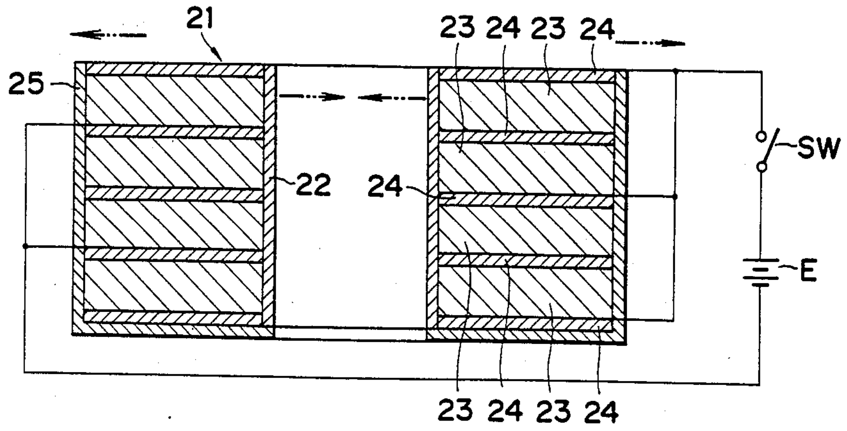
FIG. 2 is an enlarged cross-sectional view showing a holding means of the high speed electromagnetic valve mentioned above.

The valve proper 2 is joined to the lower surface of the stator 4. A spring chamber 17 communicating with the slide hole 11 is formed on the joined portion. At a portion of the valve rod 9 that runs through the spring chamber 17, an engaging plate 18 is mounted. Between this engaging plate 18 and the bottom portion 17*a* of the spring chamber 17, a spring 19 is resiliently interposed to urge the valve rod 9 in the upper direction. Moreover, a housing chamber 20 is formed in the valve proper 2 around the slide hole 11, and a holding means 21 is disposed in the housing chamber 20. This holding means 21 is formed in such a way that, as shown in FIG. 2, an annularly formed piezoelectric element 23 (made of, for example, known material such as $TiBaO_2$, $BaTiO_3$), and a similar annularly formed electrode plate 24 are laminated in a plurality of stages. A first insulation layer 22 is provided at their inside to cover an outer peripheral surface of the valve rod 9, and a second insulation layer 25 is provided which is disposed between a side surface 20*c* and the lower surface 20*b* of the housing chamber 20 at their outside and their lower side. The second insulation layer 25 is formed of a material softer than the piezoelectric element 23. The electrode plate 24 disposed in the uppermost direction is fixed to the upper surface 20*a* of the housing chamber 20.

The respective electrode plates 24 are wired to be alternately connected to a plus side or a minus side of the power source E. Accordingly, when a switch SW is thrown, each piezoelectric element 23 is impressed with the voltage of the power source E respectively. As a result, the piezoelectric element 23 produces a shape distortion (two point chained line in FIG. 2) in the radial direction by the counter piezoelectric effect and works to exert pressure on the valve rod 9.

Figure 3:
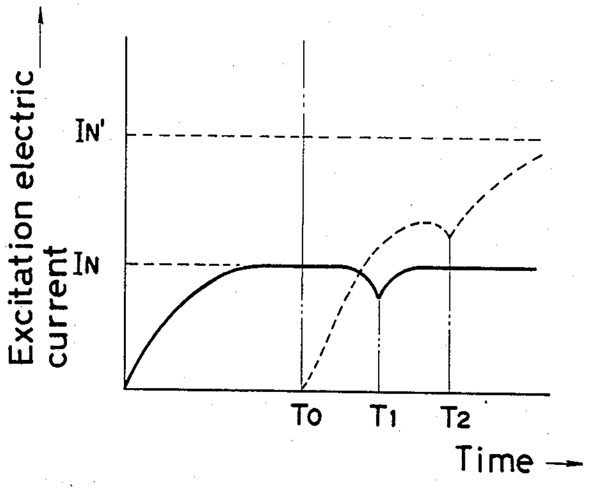
FIG. 3 is a characteristic diagram showing a displacement characteristic of excitation electric current of the high speed electromagnetic valve of the present invention and of a conventional electromagnetic valve.
Figure 4:
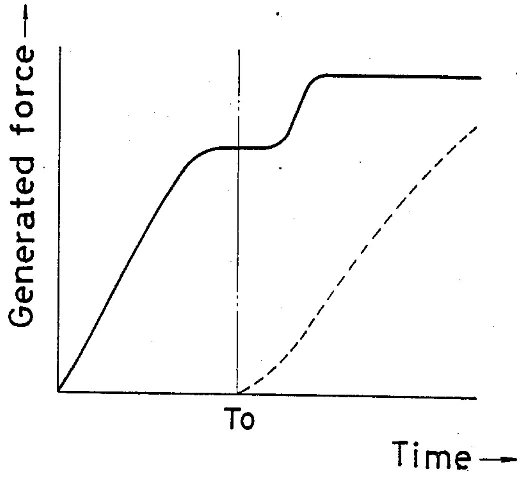
FIG. 4 is a characteristic diagram showing a displacement characteristic of generated power of the high speed electromagnetic valve of the present invention and of the conventional electromagnetic valve mentioned above.
Figure 5:
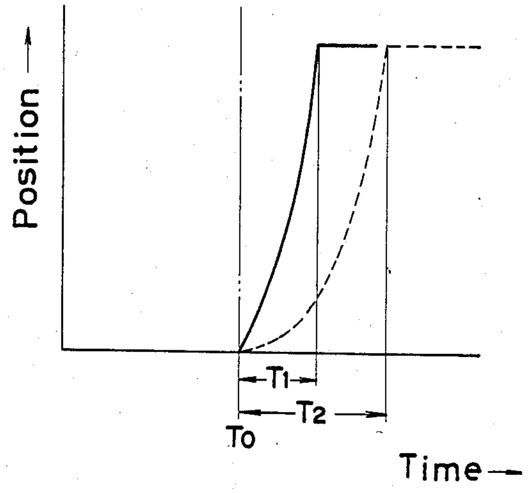
FIG. 5 is a characteristic diagram showing displaced characteristics of an armature of the high speed electromagnetic valve of the present invention and of the conventional electromagnetic valve.

However, in the foregoing construction, the operation will be described by referring to FIGS. 3 to 5, in which the fuel inlet path 14 and the fuel outlet path 15 communicate. The excitation of the excitation coils 8*a*–8*d* is stopped, the valve rod 9 is shifted in the upper direction by the pressure force of the spring 19, the valve head portion 12 is separated from the valve seat 13 and the inlet path 14 and the outlet path 15 communicate by means of the communicating path 16.

Next, in order to interrupt the fuel inlet path 14 and the fuel outlet path 15, when the inlet path 14 and the outlet path 15 communicate, the switch SW is thrown to operate the piezoelectric element 23 to fix the armature 5 and the valve rod 9 so as not to be moved. Thereafter, the excitation electric current is made to flow to the excitation coils 8*a*–8*d*. This flow of electric current is carried out sufficiently before the interruption start time $T_0$, and thus, the excitation electric current reaches the predetermined value as shown with a solid line in FIG. 3 at the interruption start time $T_0$. When the switch SW is made to open at the time $T_0$, the valve rod 9 is released from the fixture of the piezoelectric element 23, and as shown in FIG. 4, the generated force reaches a sufficient value, so that the armature 5 is attached to the stator 4 in the short time $T_1$ and is shifted to a predetermined position (solid line in FIG. 5), and the valve head portion 12 is seated on the valve seat 13 to interrupt the inlet path 14 and the outlet path 15. The excitation current decreases once as shown in FIG. 3 when the armature 5 reaches the predetermined position and then, returns to the predetermined position.

Figure 6:
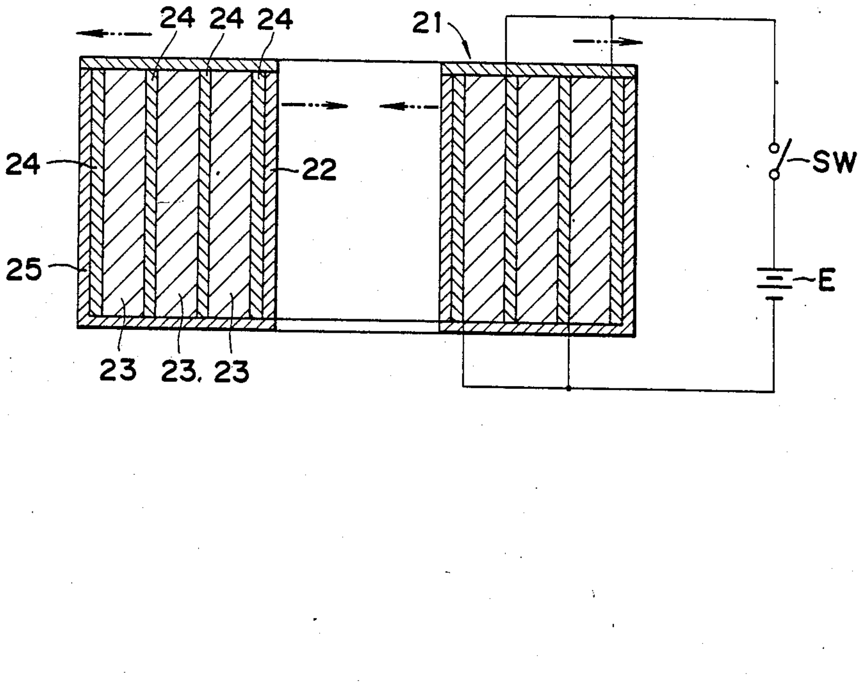
FIG. 6 is a cross-sectional view showing another embodiment of the holding means of the high speed electromagnetic valve mentioned above.

Another embodiment of the piezoelectric element 23 and the electrode plate 24 is shown in FIG. 6, and different points are described in which the hollow cylindrical shaped piezoelectric element 23 and the electrode plate 24 are alternately laminated in a radial direction and in a concentric shape.

Also, in this embodiment, as described in the foregoing, the time required for displacement of the stator 4 can be shortened when compared with the conventional type with an increment of the excitation electric current of the excitation coils 8*a*–8*d* without an increment of the magnetomotive force of the excitation coils 8*a*–8*d* so that the impressed voltage of the coils 8*a*–8*d* the same as with the conventional type, and the number of windings of the coils 8*a*–8*a* is twice that of the conventional type. For this reason, the winding resistance of the excitation coils 8*a*–8*d* becomes double but the excitation electric current becomes almost $\frac{1}{2}(In \approx \frac{1}{2}In')$ so that consumption of electric power by the coils 8*a*–8*d* can be made half of that of the conventional type.

Obviously, many modifications and variations of the present invention are possible in light of the above teachings. It is therefore to be understood that within the scope of the appended claims, the invention may be practiced otherwise than as specifically described.

What is claimed is:

1. A method of driving a high speed electromagnetic valve having a housing, a stator fixed to said housing comprising excitation coil means, an armature slidably mounted to said housing for moving toward and away from said stator and subject to an excitation force exerted by said stator when current is supplied to said excitation coil means, a valve rod fixed to said armature and slidable therewith, a spring means connected between said housing and said armature for exerting a displacement force on said armature acting in a first direction opposite to a second direction in which said excitation force acts and a piezoelectric means mounted to said housing around said valve rod, said method comprising:

initially applying voltage to said piezoelectric means mounted to said housing around said valve rod thereby causing said piezoelectric means to contract to exert pressure on said valve rod such that said valve rod and said armature fixed thereto are held by said piezoelectric means and cannot slide relative to said housing and said stator;

while applying said voltage to said piezoelectric means, exciting said excitation coils thereby exerting said excitation force on said armature held by said piezoelectric means; and after exciting said excitation coils, interrupting said application of voltage to said piezoelectric means thereby causing said contracted piezoelectric means to expand to release said valve rod whereby said armature and said valve rod slide in said first direction under the influence of said excitation force exerted on said armature by said stator against said displacement force exerted on said armature by said spring.

2. A method of driving a high speed valve as claimed in claim 1 and further comprising, after interrupting said application of voltage to said piezoelectric means and after said armature slides in said first direction under the influence of said excitation force, discontinuing said excitation of said excitation coils thereby discontinuing the influence of said excitation force on said armature and causing said armature and said valve rod to slide in said second direction under the influence of said displacement force of said spring.

* * * * *